Sept. 20, 1955 R. S. ZEBARTH 2,718,027
GIZZARD SLITTING APPARATUS
Filed May 14, 1951

INVENTOR.
Ralph S. Zebarth
BY
ATTORNEY.

United States Patent Office 2,718,027
Patented Sept. 20, 1955

2,718,027

GIZZARD SLITTING APPARATUS

Ralph S. Zebarth, Hickman Mills, Mo., assignor to Gordon Johnson Company, Kansas City, Mo., a corporation of Missouri Application May 14, 1951, Serial No. 226,224

3 Claims. (Cl. 17—11)

This invention relates to slicing apparatus particularly adapted for use in the field of dressing poultry and capable of automatically and effectively slicing gizzards as the same are fed through the apparatus rapidly and with relative ease, thereby requiring no skill whatsoever on the part of the operator.

It is to be appreciated that in the dressing of poultry, handling of the gizzards is fully unprofitable unless the apparatus employed for such purpose renders the task simple and rapid. Furthermore, the problem is enhanced by virtue of the fact that the gizzard must be sliced in a particular manner and its very shape and contour renders formation of a suitable slicing device, somewhat difficult. The substantially oval gizzard must be held with its opposed, dome-like surfaces in substantially the same plane as the means for severing the same and the cutting operation should take place so as to avoid complete cutting into two sections while assuring a sufficient opening to obviate the problems of subsequent cleaning.

It is the most important object of the present invention therefore, to provide a gizzard slicer that includes a stationary knife and means such as a rotating arm for receiving the gizzard and moving the same against the knife with sufficient force to present a clean, full slice without further attention so far as cutting is concerned.

Another important object of this invention is the provision of a gizzard slicer having a pair of opposed plates or panels between which is presented a channel or passage for the gizzard and within which is disposed the rotary arm for advancing the gizzard as well as the cutter that extends into the path of travel of the moving gizzard and automatically slices the same.

Another object of this invention is to provide a slicing apparatus for gizzards or the like that includes inlet and outlet openings for the gizzard, together with a deflector within the outlet opening and within the path of travel of the sliced gizzard to positively assure discharge of the same from the machine.

A further object of the present invention is to provide slicing apparatus that includes a rotary arm provided with a gizzard-receiving notch formed to hold the gizzard in place positively as the same is shifted from a feeding position, past the knife for slicing the same and into the aforesaid discharge opening.

It is still a further object of this invention to provide a rotary gizzard advancing notched arm having a slot intersecting the notch, thereby presenting a clearance opening for the knife as the arm rotates and moves the gizzard into cutting engagement therewith.

Other objects include the way in which fluid is directed between the panels and within the path of travel of the gizzard for cleaning purposes and for presenting smooth, anti-frictional surfaces for the gizzard as the same is advanced; the way in which one of the aforesaid gizzard-guiding or holding panels takes the form of a pan for receiving the gizzards to be sliced; the manner in which the outlet opening gizzard deflector is formed to permit free rotation of the advancing arm; and many more minor objects, all of which will be made clear or become apparent as the following specification progresses, reference being had to the accompanying drawing, wherein:

Figure 1:
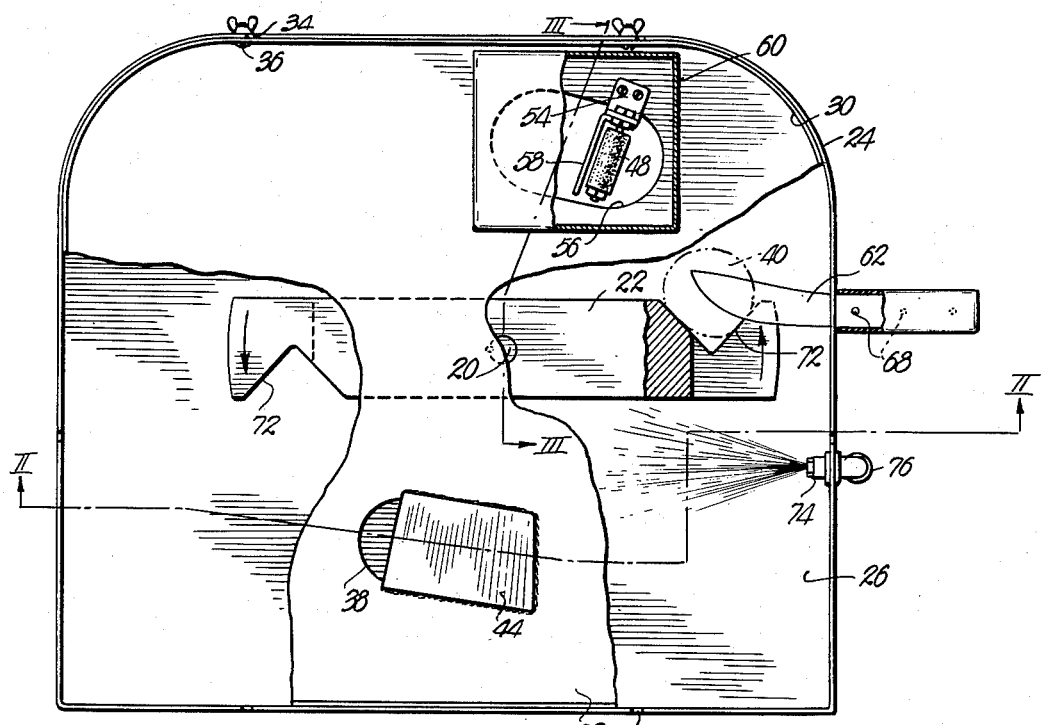
Figure 1 is a top plan view of a gizzard slicer made pursuant to the present invention, parts being broken away and in section to reveal details of construction.

Any suitable support for the apparatus of the present invention may be provided and has been shown in part in the drawing. Such support includes a hollow body broadly designated by the numeral 10 and including a horizontal table-like top wall 12. A vertical column or tube 14 depending from the wall 12 may also aid in the support of the device if desired and suitable braces, legs and the like (not shown) may be included if desired.

Figure 3:
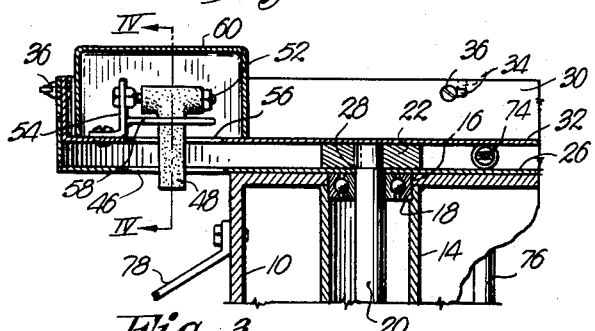
Fig. 3 is a cross-sectional view taken on irregular line III—III of Fig. 1 looking in the direction of the arrows.

The wall 12 has an opening 16 therein registering with the upper end of tube 14 for receiving a bearing 18 that in turn rotatably mounts a vertical actuating shaft 20 for an elongated arm 22. The shaft 20 may be driven by any suitable prime mover, not shown, and as illustrated in Fig. 3, extends upwardly through the protecting tube 14.

The wall 12 of support 10, receives an outermost pan 24 having its bottom wall or panel 26 resting directly upon the uppermost surface of wall 12 and provided with a clearance opening 28 for the shaft 20. The open top, relatively shallow pan 24, receives an inner pan 30 therewithin, the bottom wall 32 whereof is spaced above and disposed in parallelism with the wall 26 of pan 24. The elongated arm 22 removably secured to the shaft 20 midway between the ends of arm 22 is free to rotate within the space presented between walls 26 and 32 of pans 24 and 30 respectively.

A plurality of L-shaped slots 34 adjacent the uppermost edge of the pan 24 receive corresponding fastening elements 36 carried by the pan 30 for removably mounting the latter within the pan 24. It is seen that the elements 36 may comprise merely bolts and wing nuts and that a slight rotative action on the part of the pan 30 relative to the pan 24 aligns the fasteners 36 with respect to their slots 34 for removal and replacement as desired.

Figure 2:
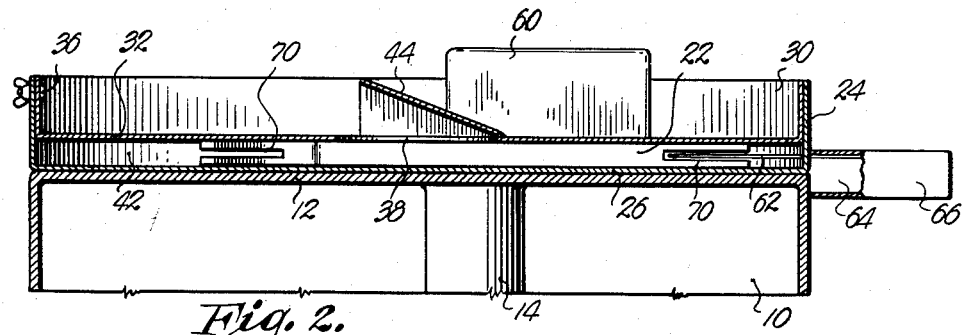
Fig. 2 is a transverse, cross-sectional view taken on irregular line II—II of Fig. 1.

An inlet opening 38 is formed in the bottom wall 32 of pan 30 for reception of gizzards 40 to be sliced within space 42 between walls 26 and 32 and a suitable hood 44 open at one end overlies at least a portion of the opening 38 and is secured to the upper face of wall 32 as shown in Figs. 1 and 2. An outlet opening 46 in diametrically opposed relationship to inlet opening 38 relative to the axis of rotation of shaft 20, is formed in the bottom wall 26 of pan 24 to one side of the support 10 as shown in Figs. 3 and 4.

An elongated deflector 48 of rubber or other resilient material, provided with a perforated hub 50, is mounted upon a short horizontal shaft 52 that is in turn disposed above the wall 32 within pan 30 and mounted on an L-shaped bracket 54 secured directly to the wall 32.

Figure 4:
Fig. 4 is a fragmentary, detailed, cross-sectional view taken on line IV—IV of Fig. 3.

The deflector 48 depends from the shaft 52 and extends through an opening 56 within wall 32 aligned with the opening 46 and also extends downwardly a short distance below the wall 26, thereby fully traversing the passageway 42 as indicated in Figs. 3 and 4. An L-shaped pin or arm 58 carried by the bracket 54 extends radially inwardly therefrom toward the shaft 20, across the deflector 48 and above the wall 32 just below the hub 50. This entire deflecting assembly is covered by a hood 60 carried by the wall 32 of pan 30.

Cutting, slitting or slicing means in the nature of an elongated knife 62 extends into the passageway 42 through a suitable clearance opening (not shown) within the pan 24, the knife 62 being within the path of travel of the gizzards 40 between the inlet opening 38 and the outlet opening 46. A laterally extending block 64 rigidly secured to the support 10 in any desired manner, receives that part of knife 62 outside the passageway 42, directly upon the uppermost face thereof and the knife 62 is removably held in place by means of a tubular sleeve 66 telescoped over the block 64 and over a portion of the knife 62. Suitable indentations and corresponding projections 68 on the knife 62 and the block 64 respectively, serve to releasably hold the knife 62 in place as the same is frictionally clamped to the block 64 by sleeve 66.

It is noted in Figs. 1 and 2 of the drawing that the knife 62 extends into the passage 42 within the path of travel of the rotating arm 22 and accordingly, the latter is provided with a clearance slot 70 at each end respectively thereof. Clearance openings 70 intersect corresponding, oppositely facing, substantially V-shaped notches 72 adjacent each end respectively of the arm 22. The notches 72 are of such size and configuration as to snugly receive the gizzards 40 therewithin in the manner shown by dotted lines in Fig. 1 of the drawing.

A suitable liquid such as water is sprayed into the channel or passage 42 by means of a nozzle 74 carried by the pan 24 adjacent and forwardly of the knife 62 and the supply of liquid to the nozzle 74 is furnished by means of a pipe 76 exteriorly of the pan 24 and the support 10.

In operation, a supply of gizzards to be sliced through use of the apparatus above described, is placed within the uppermost and innermost pan section 30 where an operator may easily and quickly move successive gizzards 40 into the opening 38 and within the path of travel of the arm 22 that preferably rotates relatively fast in the direction of the arrows indicated in Fig. 1.

The gizzards may be fed virtually as fast as is humanly possible and as soon as the gizzard 40 falls through the opening 38 into the passage 42, it is engaged by the arm 22 and received within one of its notches 72. Except for guiding the gizzard 40 properly into the opening 38 so as to assure that one of its dome-like faces will slide along the wall 26, very little positioning or maneuvering is needed on the part of the operator feeding the gizzards. For the most part it will automatically position itself within the notch 72 and be properly disposed for the desired slicing as soon as the arm 22 moves the gizzard 40 into slicing engagement with the knife 62. The liquid emanating from nozzle 74 will facilitate the free sliding movement of the gizzard between walls 26 and 32 and such liquid, as well as any foreign material that may become dislodged from within the gizzard 40 after slicing thereof, will be discharged through the outlet opening 46. The deflector 48 assures that the sliced gizzard 40 will be discharged through opening 46 rather than be carried around by the arm 22 to the feeding position.

Fig. 4 of the drawing illustrates by dotted line, the way in which the sliced gizzard 40 contacts the deflector 48 and is directed to the outlet 46 and also illustrates the way in which the deflector 48 swings to clear the arm 22 and thereupon returns to its normal vertical position extending through the openings 46 and 56. The laterally extending pin 58 limits the extent of swinging movement of the deflector 48 and serves to cause the same to return to the normal position. The sliced gizzards gravitating through the opening 46 may thereupon be deflected to a suitable container by means of a plurality of inclined fingers 78 secured to the support 10 and spaced-apart to separate the liquid and foreign matter from the gizzards.

Actual and continued use of the apparatus has proved that no additional structure is necessary to maintain the gizzards 40 within the notches 72 from the time the same enter inlet opening 38 until discharged by way of outlet 46.

It is also obvious that the size of notches 72 as well as the distance between the panels 26 and 32, may be varied to accommodate gizzards 40 of differing sizes, but for the most part, large variances in such gizzard sizes may be accommodated with a given arm 22 and a predetermined distance between panels 26 and 32. That end of knife blade 62 within space 42 should be disposed to cause cutting of gizzard 40 slightly beyond center and when so set it need not be changed as the gizzards vary in size for notches 72 will hold the same for proper slicing by knife 40. However, if such dimensions of the gizzards 40 vary considerably, auxiliary arms 22 may be provided and can be easily and quickly interchanged on the shaft 20 by the operator.

Many details of construction may vary within the broad principles and spirit of this invention, but those that fairly come within the scope of the appended claims are manifestly contemplated hereby.

Having thus described the invention, what is claimed as new and desired to be secured by Letters Patent is:

1. Apparatus for slitting gizzards comprising structure including a pair of spaced, horizontal, stationary walls defining a passageway therebetween, the uppermost wall having a gizzard-receiving inlet opening and the lowermost wall having an outlet opening spaced from the inlet opening for receiving the gizzards after the same have been slit; an arm disposed in said passageway in sliding engagement with said walls; means mounting the arm for rotation within the passageway on a vertical axis, said arm being provided with a gizzard-receiving notch spaced from the axis of rotation of the arm; a knife in the passageway; means mounting the knife within the path of travel of the arm, said arm having a horizontal clearance slot for said knife formed in the outermost end of the arm and intersecting the notch, said knife being disposed to extend partially into the notch as the arm is rotated past the knife whereby a gizzard confined in said passageway between said walls and disposed in the notch is slit by the knife and held by the notch against bisection as the arm slides the gizzard on the walls from the inlet opening to the outlet opening.

2. Apparatus for slitting gizzards as defined by claim 1 wherein is provided means for deflecting the slit gizzard from the notch through the outlet opening and including a finger mounted on said uppermost wall and extending downwardly through said outlet opening in traversing relationship to said passageway, the notch and the finger being spaced substantially equally from said axis of rotation of the arm, said finger being of resilient material for yielding under the force of the arm when the latter rotates into engagement therewith.

3. Apparatus for slitting gizzards comprising a body having a top wall; a first pan mounted on said top wall and having a bottom panel and a side wall; a second pan having a bottom panel and a side wall; means mounting the second pan within the first pan with the bottom panel thereof spaced from the bottom panel of the first pan to present a passageway between the panels; an elongated arm in said passageway spanning the distance between said panels; means mounting the arm for rotation on a vertical axis; and a knife carried by the side wall of the first pan and extending into the passageway radially inwardly toward the axis of rotation of the arm, the arm being provided with a horizontal clearance slot for the knife in the outermost end of the arm, there being a V-shaped gizzard-receiving notch in the arm adjacent said outermost end thereof, the distance between the apex of the notch and the axis of rotation of the arm being substantially the same as the distance between the innermost end of the knife and said axis of rotation whereby the gizzard is bifurcated by the knife as it is advanced through the passageway by the arm, there being a gizzard inlet opening in said panel of the second pan on one side of the knife and a gizzard-receiving outlet opening in the panel of the first pan on the opposite side of the knife.

References Cited in the file of this patent

UNITED STATES PATENTS

| | | |
|---|---|---|
| 543,168 | Bordner | July 23, 1895 |
| 675,284 | Matthiessen | May 28, 1901 |
| 692,640 | Drury | Feb. 4, 1902 |
| 827,946 | Simon | Aug. 7, 1906 |
| 1,881,908 | Papac | Oct. 11, 1932 |
| 1,939,279 | Rogalewski | Dec. 12, 1933 |
| 1,992,688 | Bonvallet | Feb. 26, 1935 |
| 2,062,353 | Criner | Dec. 1, 1936 |